(12) United States Patent
Finegan et al.

(10) Patent No.: US 8,158,713 B2
(45) Date of Patent: Apr. 17, 2012

(54) SCRUB AND STAIN-RESISTANT COATING

(75) Inventors: Catherine Ann Finegan, Warrington, PA (US); Ozzie M. Pressley, Cheltenham, PA (US); William D. Rohrbach, Perkasie, PA (US); Wei Zhang, Maple Glen, PA (US)

(73) Assignee: Rohm and Haas Company, Philadelphia, PA (US)

( * ) Notice: Subject to any disclaimer, the term of this patent is extended or adjusted under 35 U.S.C. 154(b) by 492 days.

(21) Appl. No.: 12/317,879

(22) Filed: Dec. 30, 2008

(65) Prior Publication Data

US 2009/0171005 A1 Jul. 2, 2009

Related U.S. Application Data

(60) Provisional application No. 61/009,797, filed on Jan. 2, 2008.

(51) Int. Cl.
*C08F 230/02* (2006.01)
*C08F 220/14* (2006.01)
(52) U.S. Cl. .......... 524/556; 524/560; 524/430
(58) Field of Classification Search .......... 524/556, 524/560, 430
See application file for complete search history.

(56) References Cited

U.S. PATENT DOCUMENTS

| | | | |
|---|---|---|---|
| 4,325,856 A | 4/1982 | Ishikawa et al. | |
| 4,487,859 A | 12/1984 | Martino | |
| 4,654,397 A | 3/1987 | Mueller-Mall et al. | |
| 4,733,005 A | 3/1988 | Schmidt et al. | |
| 4,814,373 A | 3/1989 | Frankel et al. | |
| 5,162,415 A | 11/1992 | Rehmer et al. | |
| 5,385,960 A | 1/1995 | Emmons et al. | |
| 6,011,109 A * | 1/2000 | Brown | 524/588 |
| 6,080,802 A | 6/2000 | Emmons et al. | |
| 6,756,459 B2 | 6/2004 | Larson et al. | |
| 7,081,488 B2 | 7/2006 | Bardman et al. | |
| 7,179,531 B2 | 2/2007 | Brown et al. | |
| 2001/0031826 A1 | 10/2001 | Laubender et al. | |
| 2002/0058749 A1* | 5/2002 | Larson et al. | 524/807 |
| 2007/0208129 A1 | 9/2007 | Finegan et al. | |
| 2007/0238827 A1 | 10/2007 | Brady et al. | |

FOREIGN PATENT DOCUMENTS

| | | |
|---|---|---|
| GB | 2 038 846 A | 7/1980 |
| JP | 3 197529 A | 8/1991 |
| WO | WO 99/25780 A1 | 5/1999 |

* cited by examiner

*Primary Examiner* — Satya Sastri
(74) *Attorney, Agent, or Firm* — Reid S. Willis

(57) ABSTRACT

A waterborne coating composition is provided, comprising a vinyl copolymer with an optimized level of phosphorus-containing functional groups in conjunction with at least 20% by weight of the copolymer, of ethyl acrylate, methyl acrylate or combinations thereof and one or more opacifying colorants, preferably titanium dioxide.

14 Claims, No Drawings

SCRUB AND STAIN-RESISTANT COATING

This application claims priority and is based on U.S. Provisional Applications 61/009,797, filed Jan. 2, 2008.

This invention relates to a waterborne coating composition with a combination of high scrub resistance and high stain resistance. More particularly, this invention relates to a waterborne coating composition comprising a vinyl copolymer with an optimized level of phosphorus-containing functional groups in conjunction with at least 20% by weight of the copolymer, of ethyl acrylate, methyl acrylate or combinations thereof and one or more opacifying colorants, preferably titanium dioxide.

Desirable interior wall coatings should be resistant to common household stains. Stain resistance involves two things: the coating's ability to resist the stain when the coating is exposed to the staining material, and the coating's ability to withstand scrubbing to remove the residual staining material that the coating did not fully resist.

U.S. Patent Publication No. 2007/0208129 A1 discloses a stain resistant waterborne coating composition comprising a vinyl polymer with an optimized level of phosphorus-containing functional groups, in conjunction with an optimized level of acid-functional or anionic monomers, steric pendant groups and titanium dioxide. Methyl acrylate (MA) and ethyl acrylate (EA) are mentioned in a list of monomers that may also be polymerized into the binder copolymer, however, there is no disclosure for selecting these particular monomers over other listed monomers nor is there disclosure for any particular ranges to achieve superior properties.

U.S. Pat. No. 6,756,459 discloses binder copolymer compositions for aqueous coatings that exhibit high gloss and superior corrosion resistance when applied to metal substrates. The copolymer includes at least one ethylenically unsaturated monomer and an ethylenically unsaturated strong acid monomer, which latter may be a phosphorus-containing monomer. Methyl acrylate (MA) and ethyl acrylate (EA) are mentioned in a list of monomers that may also be polymerized into the binder copolymer, however, there is no disclosure for selecting these particular monomers over other listed monomers nor is there disclosure for any particular ranges to achieve superior properties.

What is needed is a waterborne coating composition with a combination of high scrub resistance and high stain resistance. The requirements of high performance commercial coatings aimed at the interior wall coatings market dictate that a very wide variety of stains must be considered, ranging from very hydrophobic to very hydrophilic.

Although practitioners are aware of a number of monomers that may potentially be incorporated into an emulsion polymer, the incorporation of significant levels of ethyl acrylate or methyl acrylate into the polymer has generally been considered undesirable for wall coatings since the resulting copolymer composition is assumed to be too hydrophilic to have sufficient stain resistance to a wide variety of stains. However, the inventors, surprisingly, have discovered that copolymers that incorporate both phosphorus-containing monomers and ethyl acrylate or methyl acrylate in fact show significantly improved stain resistance properties. This effect is neither expected, nor can be predicted, based upon the copolymers containing just one of these two components, or from copolymers with lower levels of the hydrophilic monomer.

One aspect of the invention is an aqueous dispersion of copolymer particles comprising: (i) 0.5-2.0% by weight of the copolymer of phosphorus-containing monomers, in polymerized form; and (ii) at least 20% by weight of the copolymer of one or more monomers, in polymerized form, selected from the group consisting of ethyl acrylate, methyl acrylate, and combinations thereof; and (iii) up to 79.5% by weight of the copolymer of one or more monoethylenically unsaturated monomers, in polymerized form, excluding monomers (i) and (ii).

One embodiment of the invention is the aqueous dispersion of copolymer particles as described above wherein the monoethylenically unsaturated monomers in (iii) comprise from 0.5% to 5.0% by weight of the copolymer of a beta-dicarbonyl monomer or a cyanocarbonyl monomer, in polymerized form. In one such embodiment, the latter monomer is selected from the group consisting of: acetoacetoxy-functional monomers, acetoacetamido-functional monomers, cyanoacetoxy-functional monomers, and cyanoacetamido-functional monomers, and combinations thereof. In a further embodiment, the latter monomer is acetoacetoxyethyl methacrylate (AAEM).

In a further embodiment, the said beta-dicarbonyl monomer or cyanocarbonyl monomer is present in the enamine form.

Another aspect of the invention is a coating composition comprising: (A) an aqueous dispersion of copolymer particles comprising: (i) 0.5-2.0% by weight of the copolymer of phosphorus-containing monomers, in polymerized form; and (ii) at least 20% by weight of the copolymer of one or more monomers, in polymerized form, selected from the group consisting of ethyl acrylate, methyl acrylate, and combinations thereof; and (iii) up to 79.5% by weight of the copolymer of one or more monoethylenically unsaturated monomers, in polymerized form, excluding monomers (i) and (ii); and (B) one or more opacifying colorant.

One embodiment of the invention is the coating composition as described above wherein the monoethylenically unsaturated monomers in (iii) comprise from 0.5% to 5.0% by weight of the copolymer of a beta-dicarbonyl monomer or a cyanocarbonyl monomer, in polymerized form. In one such embodiment, the latter monomer is selected from the group consisting of: acetoacetoxy-functional monomers, acetoacetamido-functional monomers, cyanoacetoxy-functional monomers, and cyanoacetamido-functional monomers, and combinations thereof. In a further embodiment, the latter monomer is acetoacetoxyethyl methacrylate (AAEM).

In a further embodiment, the said beta-dicarbonyl monomer or cyanocarbonyl monomer is present in the enamine form.

Another embodiment of the invention is the composition as described in any of the embodiments above wherein the monoethylenically unsaturated monomers in (iii) comprise from 0.1% to 2.0% by weight of the copolymer of acid functional or anionic monomer, in polymerized form.

In a preferred embodiment, the opacifying colorant is titanium dioxide.

A preferred embodiment of this invention comprises a vinyl polymer with an optimized level of phosphorus-containing functional groups, in conjunction with an optimized level of ethyl acrylate or methyl acrylate, a beta-dicarbonyl monomer or cyanocarbonyl monomer, which may be in the enamine form, preferably but optionally, also comprising acid-functional or anionic monomers, which polymer is formulated together with titanium dioxide, as a pigment or filler, in a coating composition.

The emulsion copolymer of the inventive coating compositions comprises polymerized units which also comprise from 0.5-2.0%, preferably 0.8-1.6%, or 0.9-1.25%, and even more preferably 1.0-1.25%, by weight of the copolymer of phosphorus-containing monomer, in polymerized form, (i). Examples of suitable phosphorus-containing monomers include dihydrogen phosphate esters of an alcohol in which the alcohol also contains a polymerizable vinyl or olefinic group, such as allyl phosphate; mono- or diphosphate of bis(hydroxymethyl)fumarate or itaconate; derivatives of (meth)acrylic acid esters, such as, for example, phosphates of hydroxyalkyl-(meth)acrylate including 2-hydroxyethyl-(meth)acrylate, 3-hydroxypropyl-(meth)acrylates, and the like. Thus, dihydrogen phosphate ester monomers include phosphoalkyl(meth)acrylates, such as 2-phosphoethyl(meth) acrylate, 2-phosphopropyl(meth)acrylate, 3-phosphopropyl (meth)acrylate, phosphobutyl(meth)acrylate and 3-phospho-2-hydroxypropyl(meth)acrylate. For purposes of this invention, phosphoalkyl(meth)acrylates include ethylene oxide condensates of (meth)acrylates such as $H_2C=C(CH_3)COO(CH_2CH_2O)_nP(O)(OH)_2$, and the analogous propylene oxide condensates similarly, where n is from 1 to 50 in each case. Phosphoalkyl crotonates, phosphoalkyl maleates, phosphoalkyl fumarates, phosphodialkyl(meth)acrylates, phosphodialkyl crotonates, and allyl phosphate can all be used. Other suitable phosphorus-containing monomers are phosphonate-functional monomers, such as those disclosed in WO 99/25780 A1, and include vinyl phosphonic acid, allyl phosphonic acid, 2-acrylamido-2-methylpropanephosphinic acid, α-phosphonostyrene, and 2-methylacrylamido-2-methylpropanephosphinic acid. Still other suitable phosphorus-containing monomers are 1,2-ethylenically unsaturated (hydroxy)phosphinylalkyl(meth)acrylate monomers, such as disclosed in U.S. Pat. No. 4,733,005, and include (hydroxy)phosphinylmethyl methacrylate.

Preferred phosphorus-containing monomers, (i), are phosphates of hydroxyalkyl methacrylates, with 2-phosphoethyl (meth)acrylate (PEM) being the most preferred.

The composition of this invention is a coating composition comprising an emulsion copolymer whose polymerized units comprise at least 20%, preferably at least 25%, and more preferably at least 30%, by weight of the copolymer of one or more monomers, in polymerized form, selected from the group consisting of ethyl acrylate, methyl acrylate, and combinations thereof, (ii). As described below, the hydrophilic monomers, ethyl acrylate (EA) and methyl acrylate (MA), on their own, display no special advantage over other acrylic monomers in the context of wall coatings. However, in copolymers comprising phosphorus-containing monomers, the inventors have discovered an unexpected synergistic effect resulting from the combination of high levels (at least 20%) of EA or MA polymerized with the phosphorus-containing monomers. EA is the preferred monomer for component (ii).

The composition of this invention is a coating composition comprising an emulsion copolymer whose polymerized units also comprise up to 79.5% by weight of the copolymer of one or more other monoethylenically unsaturated monomers, in polymerized form, (iii). The terms (meth)acrylic and (meth) acrylate herein refer to acrylic or methacrylic, and acrylate or methacrylate, respectively. Thus, suitable other monoethylenically unsaturated monomers include, for example, (meth) acrylic esters including $C_1$ to $C_{40}$ esters of (meth)acrylic acid such as methyl methacrylate, ethyl methacrylate, butyl(meth) acrylate, 2-ethylhexyl(meth)acrylate, decyl(meth)acrylate, lauryl(meth)acrylate, stearyl(meth)acrylate, isobornyl(meth) acrylate; hydroxyalkyl esters of (meth)acrylic acid such as hydroxyethyl(meth)acrylate and hydroxypropyl(meth)acrylate; (meth)acryl amide, propenamide, and dimethylacrylamide; (meth)acrylonitrile; amino-functional and ureido-functional monomers; acid-functional or anionic monomers; monomers bearing acetoacetate-functional groups; α-olefins such as 1-decene; styrene or substituted styrenes; vinyl acetate, vinyl butyrate and other vinyl esters; vinyl monomers such as vinyl chloride, vinyl toluene, and vinyl benzophenone; vinylidene chloride; N-vinyl pyrrolidone; ethylene, propylene, and butadiene. Preferred are all-acrylic, predominantly acrylic, styrene/acrylic, and vinyl acetate/acrylic copolymers.

Thus the emulsion copolymer of the inventive coating compositions comprises polymerized units of other monoethylenically unsaturated monomers, (iii), which latter may include acid-functional or anionic monomers. In a preferred embodiment, the copolymer may comprise from 0.1-2.0%, more preferably 0.2-1.0%, and even more preferably 0.4-0.6%, by weight of the copolymer, of acid-functional or anionic monomer, in polymerized form. "Acid-functional or anionic monomer" refers to ethylenically unsaturated monomers containing acid groups or their salts, except for phosphorus-containing acid groups (or their salts). Suitable acid groups include monomers containing carboxylic acid groups and sulfur acid groups or their respective anions. Examples of unsaturated carboxylic acid monomers (or their respective anions) include acrylic acid, methacrylic acid, crotonic acid, itaconic acid, fumaric acid, maleic acid, and mono-ester derivatives of diacids, such as monomethyl itaconate, monomethyl fumarate, and monobutyl fumarate. Also included is maleic anhydride, that is able to function similarly. Examples of monomers containing sulfur acid groups include 2-acrylamido-2-methyl-1-propanesulfonic acid, sulfoethyl(meth)acrylate, sodium styrene sulfonate, and vinyl sulfonic acid. A preferred embodiment of the invention utilizes a copolymer comprising 0.5% of an acid functional monomer, in polymerized form; in one such embodiment, the acid functional monomer is methacrylic acid.

Further, the emulsion copolymer of the inventive coating compositions comprises polymerized units of other monoethylenically unsaturated monomers, (iii), which latter may include beta-dicarbonyl monomers or cyanocarbonyl monomers. This group of monomers, herein, includes monomers bearing acetoacetate-functional groups. In a preferred embodiment, the copolymer may comprise from 0.5-5.0%, more preferably 1.0-3.0%, and even more preferably at levels of approximately 1.5-2.5% by weight of the copolymer of beta-dicarbonyl monomer or cyanocarbonyl monomer, in polymerized form.

As used herein, the term "beta-dicarbonyl monomer" includes ethylenically unsaturated acetoacetoxy-functional monomers and ethylenically unsaturated acetoacetamido-functional monomers, and the term "cyanocarbonyl monomer" includes ethylenically unsaturated cyanoacetoxy-functional monomers, and ethylenically unsaturated cyanoacetamido-functional monomers.

These crosslinking monomers contain at least one crosslinking group selected from acetoacetoxy-, acetoacetamido-, cyanoacetoxy-, and cyanoacetamido-groups. Monomers containing acetoacetoxy groups include acetoacetoxy functional monomers having the structure:

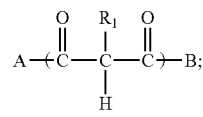

crosslinking monomers containing acetoacetamido groups include acetoacetamido functional monomers having the structure:

crosslinking monomers containing cyanoacetoxy groups include cyanoacetoxy functional monomers having the structure:

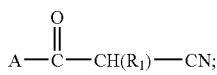

and crosslinking monomers containing cyanoacetamido groups include cyanoacetamido functional monomers having the structure:

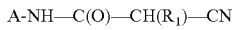

wherein
$R_1$ is either H, alkyl having 1 to 10 carbon atoms, or phenyl;
A is either:

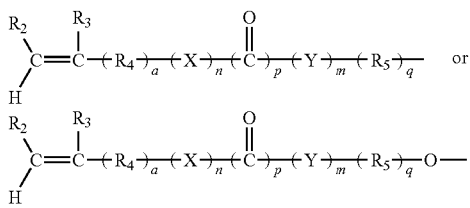

wherein
$R_2$ is either H, alkyl having 1 to 10 carbon atoms or phenyl, substituted phenyl, halo, $CO_2CH_3$, or CN;
$R_3$ is either H, alkyl having 1 to 10 carbon atoms or phenyl, substituted phenyl, or halo;
$R_4$ is either alkylene or substituted alkylene having 1 to 10 carbon atoms or phenylene, or substituted phenylene;
$R_5$ is either alkylene or substituted alkylene having 1 to 10 carbon atoms;
a, m, n, p, and q are independently either 0 or 1,
X and Y are independently either —NH— or —O—;
B is either A, alkyl having 1 to 10 carbon atoms or phenyl, substituted phenyl, or heterocyclic.

Suitable acetoacetoxy-functional monomers may include, for example, acetoacetoxyethyl(meth)acrylate, acetoacetoxypropyl(meth)acrylate, allyl acetoacetate, acetoacetoxybutyl (meth)acrylate, 2,3-di(acetoacetoxy)propyl(meth)acrylate, and vinyl acetoacetate. In general, any polymerizable hydroxy-functional monomer can be converted to the corresponding acetoacetate by reaction with a diketene or other suitable acetoacetylating agent.

Suitable acetoacetamido-functional monomers may include, for example, acetoacetamidoethyl(meth)acrylate, acetoacetamidopropyl(meth)acrylate, acetoacetamidobutyl (meth)acrylate, 2,3-di(acetoacetamido)propyl(meth)acrylate, allyl acetoacetamide, and vinyl acetoacetamide; likewise cyanoacetoxy-functional monomers are also suitable, such as, for example, cyanoacetoxyethyl(meth)acrylate, cyanoacetoxypropyl(meth)acrylate, cyanoacetoxybutyl (meth)acrylate, 2,3-di(cyanoacetoxy)propyl(meth)acrylate, allyl cyanoacetate, and vinyl cyanoacetate; as well as cyanoacetamido-functional monomers, such as, for example, cyanoacetamidoethyl(meth)acrylate, cyanoacetamidopropyl (meth)acrylate, cyanoacetamidobutyl(meth)acrylate, 2,3-di (cyanoacetamido)propyl(meth)acrylate, allyl cyanoacetamide, and vinyl cyanoacetamide.

The copolymer may be polymerized from a mixture containing one or more such monomers, which are collectively referred to herein as beta-dicarbonyl and cyanocarbonyl monomers. The preferred beta-dicarbonyl or cyanocarbonyl monomer is acetoacetoxyethyl methacrylate, AAEM.

In one embodiment, the coating compositions of this invention comprise emulsion copolymer particles and, optionally, may also comprise an entity containing —($CH_2$—CHRO)$_z$—X groups, where R=H or $CH_3$, z=3-60, and X is a nonionic, anionic or amphoteric functionality, wherein that functionality is pendant from the surface(s) of the particles. More preferably z is in the range 5-15, and both R and X=H. By "pendant," we mean either or both of two things: (1) that the —($CH_2$—CHRO)$_z$—X group may be appended to a vinyl-containing group that can be polymerized into the copolymer by adding that material during the polymerization step; and (2) a substance that contains a —($CH_2$—CHRO)$_z$—X group that is added to the dispersion of copolymer particles but does not polymerize into the copolymer but rather the group is part of a moiety that is adsorbed to the latex particle surface, for example, via ionic attractions or via Van der Waals attractions. Such an approach is described in U.S. Patent Publication 2007/0208129 (paragraphs 0027-0029). If used, the entity containing —($CH_2$—CHRO)$_z$—X groups is present preferably in an amount of 0.5-5.0% by weight, based on the weight of the rest of the copolymer.

The composition of this invention is a coating composition that also comprises an opacifying colorant, preferably titanium dioxide pigment particles. Herein, opacifying colorant means a solid particulate material or a dye. The particulate material can be inorganic or organic, or both, in nature. Included are materials known in the art as pigments, opacifying pigments, extenders, and the like. Suitable inorganic pigments include, for example, titanium dioxide, zinc oxide, iron oxide, clay, talc, calcium carbonate, magnesium silicate, and mica. Suitable organic pigments include, for example, polystyrene beads, polyethylene particles, and polymeric particles including a void such as Ropaque™ opaque polymers (Rohm and Haas Company, Philadelphia, Pa., USA). The composition optionally also comprises filler particles.

In a preferred embodiment, the total amount of titanium dioxide and fillers, combined, as a percentage of total acrylic polymer solids is from 1% to 400%, by weight, more preferably from 50% to 200%. The titanium dioxide particles can be pretreated with silica, zirconia, aluminum oxide, or mixtures thereof; and may be added to the coating composition as a dry powder or as a slurry in water with other dispersing constituents present in the slurry. Preferably, the amount of titanium dioxide as a percentage of total acrylic polymer solids is from 1% to 200%, by weight, more preferably from 50% to 150%.

A photoinitiator may optionally be used in the composition of this invention to enhance dirt resistance, for example, a substituted acetophenone or benzophenone derivative as is taught in U.S. Pat. No. 5,162,415.

The polymeric binder used in this invention is a substantially thermoplastic, or substantially uncrosslinked, polymer when it is applied to the substrate, although low levels of adventitious crosslinking may also be present.

The "glass transition temperature" or "$T_g$" of the copolymer is preferably from −20 to 60° C., more preferably −10 to 40° C., most preferably 0 to 30° C. It is measured by differential scanning calorimetry (DSC). "$T_g$" is the temperature at or above which a glassy polymer will undergo segmental motion of the polymer chain. To measure the glass transition temperature of a polymer by DSC, the polymer sample is dried, preheated to 120° C., rapidly cooled to −100° C., and then heated to 150° C., at a rate of 20° C./minute while DSC data are collected. The glass transition temperature for the sample is measured at the midpoint of the inflection using the half-height method.

The practice of emulsion polymerization is discussed in detail in D. C. Blackley, *Emulsion Polymerization* (Wiley, 1975). Conventional emulsion polymerization techniques may be used to prepare the polymer composition of this invention as an aqueous dispersion of polymer particles. The practice of emulsion polymerization is also discussed in H. Warson, *The Applications of Synthetic Resin Emulsions*, Chapter 2 (Ernest Benn Ltd., London 1972).

Thus, the ethylenically unsaturated monomers may be emulsified as known in the art with a stabilizing reagent such as an anionic or nonionic dispersing agent, also referred to as a surfactant. Emulsification of the unsaturated monomers is not required, however. Combinations of anionic and nonionic dispersing agents may also be used. High molecular weight polymers such as hydroxy ethyl cellulose, methyl cellulose, and vinyl alcohol may be used as emulsion stabilizers and protective colloids, as may polyelectrolytes such as polyacrylic acid. Acidic monomers particularly those of low molecular weight, such as acrylic acid and methacrylic acid, are water soluble, and thus may serve as dispersing agents which aid in emulsifying the other monomers used.

Suitable anionic dispersing agents include, but are not limited to, for example, the higher fatty alcohol sulfates, such as sodium lauryl sulfate; alkylaryl sulfonates such as sodium or potassium isopropylbenzene sulfonates; and alkali metal higher alkyl sulfosuccinates, such as sodium octyl sulfosuccinate.

Suitable nonionic dispersing agents include, but are not limited to, alkylphenoxy-polyethoxyethanols having alkyl groups of from about 7 to 18 carbon atoms and from about 6 to about 60 oxyethylene units, such as heptylphenoxypolyethoxyethanols, and methyloctyl phenoxypolyethoxyethanols; ethylene oxide derivatives of long chained carboxylic acids; and analogous ethylene oxide condensates of long chained alcohols.

In one embodiment of the invention described above, the polymer comprises, as a polymerized unit, a copolymerizable surfactant having at least one polymerizable ethylenically unsaturated bond. Other monomers that can be copolymerized with the polymer, such as the polyalkylene oxide-derivatized (meth)acrylate type monomers described in U.S. Patent Publication 2001/0031826 (paragraphs 0001-0002), can also be used. Such materials, and those that function similarly, can perform the role of stabilizing reagents.

The polymerization process to prepare the polymer may be a thermal or redox type; that is, free radicals may be generated solely by the thermal dissociation of an initiator species, or a redox system may be used. Conventional (thermal) free radical initiators may be used such as, for example, azo compounds, hydrogen peroxide, t-butyl or t-amyl hydroperoxide, and ammonium and/or alkali metal persulfates, typically at a level of 0.01% to 3.0% by weight, based on the weight of total monomer. Alternatively, redox systems using the same initiators (alternatively referred to as "oxidants") coupled with a suitable reductant such as, for example, sodium sulfoxylate formaldehyde, ascorbic acid, or isoascorbic acid, may be used. Redox reactions catalyzing metal salts of iron, copper, manganese, silver, platinum, vanadium, nickel, chromium, palladium, or cobalt may be used. In redox initiated systems, the reducing component is frequently referred to as an accelerator. The initiator and accelerator, commonly referred to as catalyst, catalyst system, or redox system, may be used in proportion from about 0.01% or less to 3% each, based on the weight of monomers to be copolymerized. Examples of redox catalyst systems include t-butyl hydroperoxide/sodium formaldehyde sulfoxylate/Fe(II) and ammonium persulfate/sodium bisulfite/sodium hydrosulfite/Fe(II). The polymerization temperature may be from 10° C. to 90° C., or more, and may be optimized for the catalyst system employed, as is conventional; preferably, the polymerization temperature is from 80° C. to 90° C. Emulsion polymerization may be seeded or unseeded.

Chain transfer agents such as mercaptans, polymercaptan, polyhalogen, and allyl compounds in the polymerization mixture may be used to moderate the molecular weight of the polymer. Examples of chain transfer agents which may be used include long chain $C_4$-$C_{22}$ linear or branched alkyl mercaptans such as n-dodecyl mercaptan, t-dodecyl mercaptans, alkyl thioglycolates, alkyl mercaptoalkanoates, alcohols such as isopropanol, isobutanol, lauryl alcohol, or t-octyl alcohol, carbon tetrachloride, tetrachloroethylene, tetrabromoethane, and trichlorobromoethane. Generally from 0.05 to 2 weight %, based on the weight of total monomer in the copolymer, may be used. Within a particularly desirable range of 0.1-0.5% chain transfer agent, we prefer a level of approximately 0.125% of n-dodecyl mercaptan. Alternatively, suitable molecular weights may be obtained by increasing the initiator level, or by a combination of increased initiator level and a chain transfer agent.

A monomer emulsion containing all or some portion of the monomers to be polymerized may be prepared using the monomers, water, and surfactants. A catalyst solution containing catalyst in water may be separately prepared. The monomer emulsion and catalyst solution may be cofed into the polymerization vessel over the course of the emulsion polymerization. The reaction vessel itself may initially contain water. The reaction vessel may also additionally contain seed emulsion and further may additionally contain an initial charge of the polymerization catalyst. The temperature of the reaction vessel during the emulsion polymerization may be controlled by either cooling to remove heat generated by the polymerization reaction, or by heating the reaction vessel, or a combination as required. Several monomer emulsions may be simultaneously cofed into the reaction vessel. When multiple monomer emulsions are cofed, they may be of different monomer compositions. The sequence and rates at which the different monomer emulsions are cofed may be altered during the emulsion polymerization process. The pH of the contents of the reaction vessel may also be altered during the course of the emulsion polymerization process.

In one embodiment of the present invention the emulsion polymer may be prepared by a multistage-emulsion polymerization process, in which at least two stages differing in composition are polymerized in sequential fashion. Such a process usually results in the formation of at least two mutually incompatible polymer compositions, thereby resulting in the formation of at least two phases within the polymer particles. Such particles are composed of two or more phases of various geometries or morphologies such as, for example, core/shell or core/sheath particles, core/shell particles with shell phases incompletely encapsulating the core, core/shell particles with a multiplicity of cores, and interpenetrating network particles. In all of these cases the majority of the surface area of the particle will be occupied by at least one outer phase and the interior of the particle will be occupied by at least one inner phase. Each of the stages of the multi-staged emulsion polymer may contain the same monomers, surfactants, chain transfer agents, etc. as disclosed herein-above for the emulsion polymer. For a multi-staged polymer particle, the amount of phosphorus-containing monomer, or other monomers/components, shall be determined from the overall composition of the emulsion polymer without regard for the number of stages or phases therein. The polymerization techniques used to prepare such multistage emulsion polymers are well known in the art such as, for example, U.S. Pat. Nos. 4,325,856; 4,654,397; and 4,814,373. A preferred multistage emulsion polymer may contain the phosphorus-containing monomer in only one of the stages. This same polymer stage may preferentially also contain the beta-dicarbonyl monomers or cyanocarbonyl monomers, if present.

The polymer particles of the aqueous dispersion may have a particle size of from 20 to 500 nm, preferably 20 to 250 nm, most preferably 50 to 150 nm. The particle size distribution may be unimodal, bimodal, multimodal, or broad. The average particle diameter may be measured by a quasi-elastic light scattering technique, using an instrument such as a Brookhaven Model BI-90 Particle Sizer, supplied by Brookhaven Instruments Corporation, Holtsville, N.Y. Alternatively, for colloids with multi-mode particle size distributions, a particle size analysis method known as capillary hydrodynamic fractionation (CHDF) may be used with an instrument such as the Matec CHDF 2000 (from Matec Applied Sciences, Northborough, Mass.).

The inventive polymers have a weight average molecular weight, $M_w$, in the range 20,000-5,000,000 (preferably 100,000-1,000,000, and more preferably 100,000-500,000) as measured by GPC. (Molecular weights are usually represented as unit-less in the art, although these same numbers may be referred to in units of Daltons). If the $M_w$ becomes too low, durability upon exterior exposure is compromised. If the $M_w$ becomes too high, the abrasive scrub performance is compromised: Chain transfer agents are not essential in the practice of this invention. However, in a preferred embodiment, the copolymer of the invention has a molecular weight of approximately 100,000-500,000, which molecular weight is more readily accessed using a chain transfer agent, such as n-dodecyl mercaptan (n-DDM).

In a preferred embodiment, the polymerization of the copolymer particles is accomplished using a gradual addition feed process. In this process, a seed polymer is added or formed in situ, and then grown out through the gradual addition of monomer(s). In the case where the seed is formed in situ, a small charge of monomer emulsion to the reactor, typically 3% of the whole monomer emulsion mix, is made and the polymerization is initiated to form a seed. In other cases a fully polymerized particle is added to the reactor of a composition compatible with the monomers to be charged. These are standard emulsion polymerization techniques well known to those skilled in the art.

In another preferred embodiment of this invention, the pH is controlled during polymerization of the copolymer to be between 1.5 to 4.5 throughout at least 70% of the phosphorus-containing acidic monomer feed, preferably between 1.5 to 3.5 throughout 70% of the phosphorus-containing acidic monomer feed, and most preferably between 2.0 to 3.0 throughout 100% of the phosphorus-containing acidic monomer feed. The pH does not necessarily have to be controlled over the initial 70% range of the monomer addition, but alternatively can be controlled over the final 70% of the addition, or even over some intermediate portion of the monomer addition. This approach is discussed in US Patent Publication No. 2007/0208129 (paragraphs 0047-0048).

In another preferred embodiment of the present invention, the copolymer is produced by a process in which the acid-functional (carboxylate) monomers and phosphorus-containing monomers are co-fed to the polymerization. This can be done, for example, by forming a monomer emulsion comprising both monomers, and gradually feeding this monomer emulsion to the batch reaction. The beta-dicarbonyl monomer or cyanocarbonyl monomer may also be co-fed to the polymerization; thus, it may, for example, be included in this same monomer emulsion, above, or otherwise added. This technique is also described in US Patent Publication No. 2007/0208129 (paragraphs 0049).

Also contemplated is the staged feed of one or more of the functional monomers of the invention, as described, for example, in U.S. Patent Publication No. 2007/0238827 (paragraphs 0009-0011).

A particularly preferred embodiment of the invention is summarized in the coating compositions that may be formulated from the copolymer composition of Polymer Sample 12, as described in Example 1 and Tables 1 and 4 below. Paint Sample 12 is one such representative coating composition comprising Polymer Sample 12 (see Tables 5, 6, and 7; formulation in Table 3).

Other components may be added to the polymer composition of this invention, including without limitation, other polymers such as vinyl acetate polymers, styrene butadiene polymers, acrylic copolymers, and vinyl chloride copolymers; other pigments or fillers; surfactants; plasticizers; buffers; neutralizers; humectants; waxes; dyes; pearlescents; adhesion promoters; tackifiers; dispersants; defoamers; leveling agents; optical brighteners; ultraviolet stabilizers such as hindered amine light stabilizers; cosolvents; coalescents; rheology modifiers or thickeners; preservatives; biocides; and antioxidants. The preparation of paint formulations comprising such polymers is known in the art (U.S. Pat. No. 5,385,960).

The coating composition of this invention may be applied onto substrates using conventional coating application methods, such as, for example, brushing, rolling, dipping, and spraying methods. Substrates to which the coating composition of this invention may be applied include, for example, timber including but not limited to cedar, pine, teak, oak, maple, and walnut; processed timber including but not limited to medium density fiber board, chip board, laminates; mineral substrates including but not limited to masonry, concrete, stucco, fiber, mortar, cement, cement asbestos, plaster, plasterboard, glazed and unglazed ceramic; metal including but not limited to galvanized iron, galvanized steel, cold rolled steel, Zincalum™ metal, Zincalum™ II metal, aluminum, wrought iron, drop forged steel, and stainless steel; previously painted or primed surfaces (fresh, aged or weathered) including but not limited to acrylic coatings, vinyl acrylic coatings, styrene acrylic coatings, powder coated surfaces, solvent acrylic coatings, alkyd resin coatings, solvent urethane coatings, and epoxy coatings; synthetic substrates including but not limited to polyvinyl chloride, polyvinylidene chloride, polyethylene, and polypropylene; asphalt; cellulosic substrates such as paper, paperboard, wallpaper, and wallboard; glass; leather; and woven and nonwoven material such as cloth, wool, synthetic and natural fiber, and textiles. The coating composition may be used, for example, as a wood coating, maintenance coating, interior or exterior wall coating, metal primer or coating, traffic paint, leather coating, coil coating, architectural coating, mastic sealant, caulk, board coating, paper coating, ink, flooring coating, and adhesive. Coatings prepared from the polymer composition may be flat coatings, satin coatings, semi-gloss coatings, gloss coatings, primers, textured coatings, and the like.

After the coating composition has been applied to a substrate, the coating composition is dried or is allowed to dry to form a film. Heat may be applied to dry the coating composition.

Test Procedures

The following test procedures were used to generate the data reported in the Examples below.

Scrub Resistance Test

This test (based on ASTM D 2486-06) was performed as follows:

A. Preparation of Apparatus:
1. Abrasion Tester—An abrasion testing device is used which consists of a brush clamped into a bracket which is moved back and forth over the dried, applied paint film by means of a set of cables on either side. The abrasion tester must be leveled before use and operated at 37±1 cycles/minute.
2. Brush—The bristles, if new, must be leveled before use to permit uniform wear on the paint surface. Leveling is accomplished by running the brush over 100 or 120 mesh aluminum oxide close grain sandpaper.

B. Test:
1. Draw down the paint on a black vinyl chart (Type P-121-10N, The Leneta Company) using the 7 mil opening of a 7/10 Dow film caster, starting from the secured end of the panel. The time for application should be fairly slow, 3 to 4 seconds from end to end, to prevent formation of pinholes in the film. Air dry in a horizontal position for 7 days in an open room kept at 73.5+/−3.5° F. and 50+/−5% relative humidity.
2. Make three drawdowns of each sample. Test two and average them if they are within 25% repeatability. If they are not, test a third and average the three.
3. Secure the drawdown to the abrasion tester by using a gasketed frame and brass weights or clamps.
4. Mount the brush in the holder. Spread 10 grams of a scrub medium (Abrasive Scrub Medium, Type SC-2, The Leneta Company) evenly on the brush bristles. Place the brush at the center of the path. The brush is bristle side up when applying the scrub medium and water, then carefully turn it bristle-side down when starting the test.
5. Start the test. After each 400 cycles before failure, remove the brush (do not rinse); add 10 g of stirred scrub medium; replace the brush. Place 5 ml of water on the brush before continuing.
6. Record the number of cycles to remove the paint film fully in one continuous line.

Stain Resistance Test

Procedure (ASTM Method D 4828):
1. Cast the test paint on a black vinyl chart with a 7 mil (wet) Dow applicator. Cast a control paint adjacent to the test paint. Dry 1 week at 77+/−3.5° F. and 50+/−5% relative humidity.
2. Mark one half inch sections across the test panel as shown. The total number of sections should correspond to the total number of stains selected plus a ½" gap between stains.
3. Each stain is then applied uniformly to fill in the test area. In order to contain stains to the test area, wet stains, such as grape juice and coffee, can be applied over a ½" strip of cheesecloth which will soak up excess liquid and prevent it from bleeding into the other stained areas.
4. Allow the stains to soak in for at least ½ hour.
5. Wipe off the excess stain with a dry paper towel or dry cheesecloth.
6. For each test sample, prepare a new 6"×9" cheesecloth and attach to a 1 lb abrasion boat. Saturate the cheesecloth with a 1% Tide® laundry detergent solution.
7. Scrub panel for 200 cycles with the 1 lb boat, using a cabled scrub testing device.
8. Rinse panel thoroughly with water, let dry, and then rate the degree of stain removal by eye, on a scale of 1 to 10, corresponding to 10% to 100% removal, by comparing to un-scrubbed sides (i.e. 10 is the best score).

EXAMPLES

Example 1

Synthesis of Aqueous Emulsion Copolymers, Polymer Samples 1-14

Acrylic copolymer dispersions were prepared as follows. A 5-liter, four necked round bottom flask was equipped with paddle stirrer, thermometer, nitrogen inlet and condenser. A mixture of 5.0 grams of Triton™ XN-45S and 907 grams of deionized water was added to the flask and heated to 86° C. under a nitrogen atmosphere. A monomer emulsion (ME) was prepared by mixing 495 grams of deionized water, 28.3 grams of Triton™ XN-45S, acrylic monomers (quantities of each monomer can be found in Table 1), and 2.5 grams of n-dodecyl mercaptan. With the kettle water at 86° C., the following materials were added in order: a solution of 0.36 grams of 5% 4-hydroxy-TEMPO (4-hydroxy-2,2,6,6,-tetramethyl-piperidinyloxy) in 10 grams of deionized water, a solution of 3.2 grams of ammonium bicarbonate in 25 grams of deionized water, 81 grams of ME, and a solution of 4 grams of ammonium persulfate in 25 grams of deionized water. After 10 minutes, a mixture of 19.8 grams of 0.15% iron sulfate solution and 2.9 grams of 1% ethylenediaminetetraacetic acid, tetrasodium salt solution was added. The remaining ME was then added over a period of 120 minutes at 86° C. A cofeed mixture (4 grams of 85% tert-amyl hydroperoxide, 0.6 grams of Triton™ XN-45S, and 144.2 grams of deionized water) and a cofeed solution (3.1 grams of isoascorbic acid in 133 grams of deionized water) were gradually added over a period of 120 minutes. When half of the ME was added to the kettle, 11.0 grams of ammonium hydroxide (28%) was added to the isoascorbic acid cofeed solution. After the completion of the monomer addition, the ME container was rinsed with 50 grams of deionized water. A mixture of 0.5 grams 85% tert-amyl hydroperoxide, 0.02 grams of Triton™ XN-45S, and 8 grams of deionized water was added, followed by a solution of 0.5 grams of isoascorbic acid in 12 grams of deionized water. The dispersion was then cooled to 60° C. While the reaction mixture was allowed to continue to cool, a mixture (0.5 grams 85% tert-amyl hydroperoxide, 0.02 grams of Triton™ XN-45S, and 25 grams of deionized water) and a solution (0.5 grams of isoascorbic acid in 25 grams of deionized water) were then added over 30 minutes. A 28% ammonium hydroxide solution was added to the kettle to bring the pH to 9.5-9.7 (quantity in Table 1), after which the dispersion was filtered to remove any coagulum. The solids, particle size and pH of the final dispersions are summarized in Table 2. Triton is a trademark of Dow Chemical Company, Midland, Mich., USA.

In the Examples, the following abbreviations are used:
BA Butyl acrylate
EA Ethyl acrylate
MMA Methyl methacrylate
MAA Methacrylic acid
AAEM Acetoacetoxyethyl methacrylate
PEM Phosphoethyl methacrylate
NH$_4$OH Ammonium hydroxide, 28% solution (neutralizer)

The specific quantities of monomers present in the monomer emulsion (ME) for each synthesis of the copolymers, Polymer Samples 1-14, are shown in Table 1, below, with polymer dispersion characteristics given in Table 2.

TABLE 1

Polymer Samples 1-14: Synthesis of Acrylic Copolymer Dispersions (in grams)

| Material | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| ME | | | | | | | | | | | | | | |
| BA | 1040 | 1040 | 1030 | 880 | 880 | 800 | 800 | 720 | 560 | 560 | 560 | 560 | 560 | 580 |
| EA | 0 | 0 | 0 | 200 | 200 | 300 | 300 | 400 | 600 | 600 | 600 | 600 | 600 | 600 |
| MMA | 940 | 950 | 880 | 850 | 830 | 820 | 790 | 790 | 790 | 770 | 760 | 750 | 730 | 770 |
| MAA | 20 | 10 | 10 | 10 | 10 | 10 | 10 | 10 | 10 | 10 | 10 | 10 | 10 | 10 |
| AAEM | 0 | 0 | 40 | 40 | 40 | 40 | 40 | 40 | 40 | 40 | 40 | 40 | 40 | 0 |
| "PEM" | 0 | 0 | 40 | 20 | 40 | 30 | 60 | 40 | 0 | 20 | 30 | 40 | 60 | 40 |
| NH$_4$OH | 6.0 | 4.0 | 38.3 | 28.0 | 38.3 | 33.1 | 48.5 | 38.3 | 17.8 | 28.0 | 33.1 | 38.3 | 48.5 | 27.3 |

"PEM" in Table 1 refers to the addition of a material that is 61% active strong acid phosphorus-containing monomer. Thus, Sample 3 is made using 2% by weight of the material identified as "PEM", but this is equivalent to the addition of 1.22% by weight of the strong acid phosphorus-containing monomer.

TABLE 2

Characterization of Polymer Dispersions 1-14

| Properties | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Particle Size (nm) | 109 | 110 | 111 | 107 | 112 | 109 | 110 | 110 | 109 | 117 | 109 | 110 | 110 | 110 |
| Solids (%) | 51.4 | 51.5 | 50.4 | 50.7 | 50.6 | 50.8 | 50.4 | 50.6 | 50.8 | 50.4 | 50.7 | 50.3 | 50.7 | 50.8 |
| pH | 9.0 | 9.0 | 9.6 | 9.7 | 9.6 | 9.6 | 9.4 | 9.5 | 9.7 | 9.5 | 9.6 | 9.6 | 9.4 | 9.5 |

Example 2

Formulation of Paint Samples 1-14

Conventional semi-gloss interior wall paints were prepared as known in the art using the latex emulsion binders from Polymer Samples 1-14 according to the following formulation (Table 3). The components of the pigment grind were milled on a high speed disk disperser. The grind was added to the letdown following the techniques described in U.S. Pat. No. 5,385,960.

TABLE 3

Paint Formulation for Paint Samples 1-14

| Materials | Amount (grams) |
|---|---|
| Grind | |
| TitaniumDioxide | 298.84 |
| Extender | 14.82 |
| Pigment Dispersant | 8.80 |
| Nonionic Surfactant | 4.00 |
| Attapulgite Clay | 2.98 |
| Defoamer | 2.00 |
| Water | 10.00 |
| LetDown | |
| Latex Emulsion | 432.04 |
| OpaquePolymer | 56.89 |
| Rheology Modifier | 32.00 |
| Glycol | 7.75 |
| Coalescent | 4.70 |
| Defoamer | 1.50 |
| Water | 168.38 |

Example 3

Evaluation of Stain Resistance for Paint Samples 1-14

Paints Samples 1-14 were identically formulated, (Table 3), and were evaluated for stain resistance. In these paints, only the polymer composition varies, as shown in Table 4, below.

TABLE 4

Variation of Binder Compositions for Paint Samples 1-14 (weight %)

| Sample | Binder Composition[1] | | | |
|---|---|---|---|---|
| | EA | "PEM"[2] | MAA | AAEM |
| 1 | 0 | 0 | 1.0 | 0 |
| 2 | 0 | 0 | 0.5 | 0 |
| 3 | 0 | 2 | 0.5 | 2 |
| 4 | 10 | 1 | 0.5 | 2 |
| 5 | 10 | 2 | 0.5 | 2 |
| 6 | 15 | 1.5 | 0.5 | 2 |
| 7 | 15 | 3 | 0.5 | 2 |
| 8 | 20 | 2 | 0.5 | 2 |
| 9 | 30 | 0 | 0.5 | 2 |
| 10 | 30 | 1 | 0.5 | 2 |
| 11 | 30 | 1.5 | 0.5 | 2 |
| 12 | 30 | 2 | 0.5 | 2 |
| 13 | 30 | 3 | 0.5 | 2 |
| 14 | 30 | 2 | 0.5 | 0 |

[1]For each sample, the monomer components sum to 100; in each case the balance of the composition comprises BA/MMA in a ratio that, in total (i.e. including EA, PEM, MAA, and AAEM) results in a constant Tg polymer.
[2]"PEM" in Table 4 refers to the addition of a material that is 61% active strong acid phosphorus-containing monomer. Thus, Sample 3 is made using 2% by weight of the material identified as "PEM", but this is equivalent to the addition of 1.22% by weight of the strong acid phosphorus-containing monomer. In the discussion below, any reference to levels of PEM refers to the level of addition of the material used in the monomer emulsion and shown above in this table. However, quantities in the claims are adjusted to reflect the levels of strong acid phosphorus-containing monomer.

The stain resistance test for the Paint Samples 1-14 was performed according to the ASTM D-4828 method, as described above, and evaluated according to both the ASTM D-4828 method and the Marschall Laboratories Method. The results are shown in Tables 5 and 6.

TABLE 5

Household Stain Resistance for Paint Samples 1-14: ASTM Method D-4828

| Sample | Ink | Washable Marker | Pencil | Crayon | Lipstick | Mustard | Coffee | Grape Juice | Betadine |
|---|---|---|---|---|---|---|---|---|---|
| 1 | 5 | 10 | 3 | 3 | 3 | 3 | 3 | 3 | 5 |
| 2 | 2 | 10 | 5 | 0 | 3 | 3 | 3 | 3 | 7 |
| 3 | 5 | 10 | 5 | 3 | 3 | 3 | 5 | 7 | 5 |
| 4 | 5 | 10 | 5 | 3 | 3 | 3 | 3 | 5 | 5 |
| 5 | 5 | 10 | 5 | 5 | 5 | 3 | 5 | 7 | 5 |
| 6 | 5 | 10 | 5 | 5 | 5 | 3 | 3 | 7 | 5 |
| 7 | 5 | 10 | 3 | 5 | 7 | 3 | 10 | 10 | 5 |
| 8 | 5 | 10 | 5 | 5 | 5 | 3 | 5 | 7 | 5 |
| 9 | 3 | 7 | 5 | 5 | 3 | 3 | 3 | 0 | 5 |
| 10 | 3 | 10 | 5 | 7 | 5 | 5 | 7 | 7 | 5 |
| 11 | 5 | 10 | 3 | 7 | 5 | 5 | 7 | 7 | 7 |
| 12 | 5 | 10 | 5 | 5 | 5 | 5 | 10 | 7 | 7 |
| 13 | 5 | 10 | 3 | 7 | 7 | 5 | 10 | 10 | 7 |
| 14 | 5 | 10 | 5 | 5 | 5 | 5 | 5 | 7 | 5 |

ASTM D-4828 Rating Scale:
0 = No change from original intensity (depth) of soil or stain
3 = Slight change from original, but readily visible
5 = Moderate change from original, slightly visible
7 = Large change from original, barely visible
10 = All soil and stain removed

TABLE 6

Household Stain Resistance for Paint Samples 1-14: Marschall Laboratories Method

| Sample | Ink | Washable Marker | Pencil | Crayon | Lipstick | Mustard | Coffee | Grape Juice | Betadine |
|---|---|---|---|---|---|---|---|---|---|
| 1 | 8 | 10 | 3 | 2 | 6 | 4 | 1 | 2 | 7 |
| 2 | 8 | 10 | 5 | 1 | 6 | 4 | 1 | 2 | 9 |
| 3 | 7 | 10 | 4 | 2 | 3 | 3 | 5 | 8 | 5 |
| 4 | 7 | 10 | 4 | 2 | 3 | 2 | 3 | 7 | 4 |
| 5 | 7 | 10 | 4 | 5 | 6 | 3 | 5 | 8 | 4 |
| 6 | 7 | 10 | 4 | 5 | 5 | 3 | 4 | 8 | 4 |
| 7 | 7 | 10 | 1 | 5 | 7 | 3 | 10 | 10 | 5 |
| 8 | 7 | 10 | 4 | 5 | 5 | 3 | 6 | 8 | 5 |
| 9 | 5 | 8 | 5 | 5 | 4 | 2 | 2 | 1 | 5 |
| 10 | 5 | 10 | 5 | 8 | 6 | 5 | 8 | 8 | 4 |
| 11 | 7 | 10 | 2 | 8 | 5 | 4 | 7 | 8 | 7 |
| 12 | 7 | 10 | 4 | 5 | 6 | 4 | 10 | 9 | 6 |
| 13 | 7 | 10 | 2 | 8 | 9 | 4 | 10 | 10 | 6 |
| 14 | 7 | 10 | 5 | 4 | 6 | 4 | 7 | 8 | 5 |

Marschall Laboratories Rating Scale:
10 = 90% or more removed
9 = 80% removed
8 = 70% removed
7 = 60% removed
6 = 50% removed
5 = 40% removed
4 = 30% removed
3 = 20% removed
2 = 10% removed
1 = <5% removed The wide variety of stains studied makes the test particularly challenging. It can be seen that the use of the phosphorus-containing monomer, PEM, enhances the stain resistance of the paint (see, for example, the poor performance of Paint Samples 1, 2, and 9, which do not contain PEM; and compare Paint Sample 9 with Paint Samples 10-13, which have equivalent compositions containing varying levels of PEM). Moreover, increasing levels of PEM result in further improvements to stain resistance, particularly in the more challenging stains: lipstick, coffee, and grape juice (compare, for example, Paint Samples 4 and 5; Paint Samples 6 and 7; or compare Paint Samples 9-13).

However, the addition of PEM, on its own, is not sufficient to obtain good stain resistance across a wide variety of stains. Paint Sample 3, which uses a polymer comprising 2% PEM, but does not comprise ethyl acrylate (EA), shows poor performance in a number of stain categories, and fails to meet the performance requirements of current commercial products. Addition of small amounts of EA in paints comprising PEM-containing polymers, for example 10% EA (see Paint Sample 5), or even 20% EA (see Paint Sample 8), has only a minor effect on the stain resistance properties. Surprisingly, for the paints with PEM-containing polymers, there is a significant improvement in the stain resistance properties when high levels of EA are used (see, for example, the equivalent compositions that contain 2% PEM, but vary in levels of EA: i.e. Paint Sample 12 with 30% EA, compared to Paint Samples 3, 5 and 8 with 0%, 10%, and 20% EA levels, respectively).

That this effect is not simply due to EA is evidenced by the stain resistance performance of Paint Sample 9 (30% EA, but 0% PEM)—there is no suggestion of any advantageous effect in the use of EA in the absence of PEM.

The data reveal a synergistic effect on the stain resistance properties for polymers containing both PEM and high levels of EA (at least 20%, and preferably 30% EA).

Example 4

Evaluation of Scrub Resistance for Paint Samples 1-14

Stain resistance relates also to the coating's ability to withstand scrubbing to remove the residual staining material that the coating did not fully resist. Paint Samples 1-14 were also evaluated for scrub resistance, according to the test procedure ASTM D-2486-06, as described above. Scrub resistance results for Paint Samples 1-14 are shown below in Table 7, for which a scrub resistance of 800 cycles is considered a "pass" (acceptable performance).

TABLE 7

Scrub Resistance for Paint Samples 1-14: ASTM Method D-2486-06

| Sample | Binder Composition | | | | Scrub Results | |
|---|---|---|---|---|---|---|
| | EA | PEM | MAA | AAEM | # of Data Points | Average Cut Thru |
| 1 | 0 | 0 | 1.0 | 0 | 6 | 1472 |
| 2 | 0 | 0 | 0.5 | 0 | 6 | 1020 |
| 3 | 0 | 2 | 0.5 | 2 | 6 | 859 |
| 4 | 10 | 1 | 0.5 | 2 | 6 | 1507 |
| 5 | 10 | 2 | 0.5 | 2 | 6 | 929 |
| 6 | 15 | 1.5 | 0.5 | 2 | 6 | 879 |
| 7 | 15 | 3 | 0.5 | 2 | 6 | 731 |
| 8 | 20 | 2 | 0.5 | 2 | 6 | 896 |
| 9 | 30 | 0 | 0.5 | 2 | 6 | 1504 |
| 10 | 30 | 1 | 0.5 | 2 | 6 | 1558 |
| 11 | 30 | 1.5 | 0.5 | 2 | 6 | 852 |
| 12 | 30 | 2 | 0.5 | 2 | 6 | 994 |
| 13 | 30 | 3 | 0.5 | 2 | 6 | 702 |
| 14 | 30 | 2 | 0.5 | 0 | 6 | 724 |

It can be seen that the higher scrub resistance numbers are associated with the paints formulated with polymers comprising the lower levels of phosphorus-containing monomer (Paint Samples 1, 2, and 9, which comprise 0% PEM; and Paint Samples 4 and 10, which comprise 1% PEM). There is no meaningful reduction in the scrub resistance resulting from addition of small quantities of PEM (e.g. 1% PEM) into the polymer. However, levels of 1.5% PEM, or greater, negatively impact scrub resistance, with 3.0% levels of PEM producing scrub resistance performance that falls below the minimum targeted performance (see Paint Samples 7 and 13).

At a given level of PEM, the effect of EA levels on scrub resistance is minor (for example, compare Paint Samples 4 and 10; or 6 and 11; or Paint Samples 3, 5, 8, and 12; etc.).

Paint Sample 12 (comprising 2% AAEM) can be compared with Paint Sample 14 (equivalent composition, except without AAEM) to show that addition of AAEM positively impacts scrub resistance and can be used to boost this performance measure. Moreover, a comparison of the same pairing of paint samples in Tables 5 and 6 shows that the addition of AAEM produces no detrimental effect on the stain resistance properties. Thus, the use of PEM offers a trade-off between a much improved, and otherwise heretofore unattainable, balance of stain resistance properties, and the decreased scrub resistance seen at higher levels of PEM (e.g. 2-3% PEM); the latter decrease is somewhat recoverable through the addition of AAEM in the polymer.

Targeting a minimum scrub resistance of approximately 800 cycles, the optimized binder polymer composition comprises less than 3% PEM. Combining the performance characteristics displayed in Tables 5 and 6 for stain resistance, and those displayed in Table 7 for scrub resistance, it can be seen that a very good balance of properties is obtainable centered around the paint composition represented by Paint Sample 12, which comprises the binder Polymer Sample 12. This paint sample (comprising a polymer with 2% PEM) maintains a high scrub resistance, 994 cycles, while benefiting from the synergistic effect, described above, of having both PEM and 30% EA in the polymer, in producing good stain resistance to a wide variety of stains.

Similar data sets for stain resistance and scrub resistance were collected for these polymers in a variety of paint formulations; the same trends were seen in each case.

We claim:

1. A coating composition comprising:
 (A) an aqueous dispersion of thermoplastic copolymer particles comprising:
  (i) 0.5-2.0% by weight of the copolymer of phosphorus-containing monomers, in polymerized form; and
  (ii) at least 20% by weight of the copolymer of one or more monomers, in polymerized form, selected from the group consisting of ethyl acrylate, methyl acrylate, and combinations thereof; and
  (iii) 0.5 to 5.0% by weight of the copolymer of a beta-dicarbonyl monomer or a cyanocarbonyl monomer, in polymerized form; and
  (iv) up to 74.5% by weight of the copolymer of one or more mono-ethylenically unsaturated monomers, in polymerized form, excluding monomers (i), (ii) and (iii); and
 (B) one or more opacifying colorants.

2. The composition of claim 1 wherein the said beta-dicarbonyl monomer or cyanocarbonyl monomer is selected from the group consisting of: acetoacetoxy-functional monomers, acetoacetamido-functional monomers, cyanoacetoxy-functional monomers, and cyanoacetamido-functional monomers, and combinations thereof.

3. The composition of claim 1 wherein the said beta-dicarbonyl monomer or cyanocarbonyl monomer is acetoacetoxyethyl methacrylate (AAEM).

4. The composition of claim 1 wherein the said beta-dicarbonyl monomer or cyanocarbonyl monomer is present in the enamine form.

5. The composition of claim 1 wherein the monoethylenically unsaturated monomers in (iii) comprise from 0.1% to 2.0% by weight of the copolymer of acid functional or anionic monomer, in polymerized form.

6. The composition of claim 1 wherein the copolymer comprises from 0.8% to 1.6% by weight of the copolymer of the said phosphorus-containing monomer.

7. The composition of claim 5 wherein the said acid functional or anionic monomers and the phosphorus-containing monomers are co-fed to the polymerization.

8. The composition of claim 1 wherein the copolymer has a molecular weight in the range of 100,000 to 500,000.

9. The composition of claim t wherein the phosphorus-containing monomer is phosphoethyl methacrylate.

10. The composition of claim 1 wherein the opacifying colorant is titanium dioxide.

11. An aqueous dispersion of copolymer particles comprising:
- (i) 0.5-2.0% by weight of the copolymer of phosphorus-containing monomers, in polymerized form; and
- (ii) at least 20% by weight of the copolymer of one or more monomers, in polymerized form, selected from the group consisting of ethyl acrylate, methyl acrylate, and combinations thereof; and
- (iii) 0.5 to 5.0% by weight of the copolymer of a beta-dicarbonyl monomer or a cyanocarbonyl monomer, in polymerized form; and
- (iv) up to 74.5% by weight of the copolymer of one or more mono-ethylenically unsaturated monomers, in polymerized form, excluding monomers (i), (ii) and (iii).

12. An aqueous dispersion of thermoplastic copolymer particles comprising:
- (i) 0.5-2.0% by weight of the copolymer of phosphorus-containing monomers, in polymerized form;
- (ii) at least 20% by weight of the copolymer of one or more monomers, in polymerized form, selected from the group consisting of ethyl acrylate, methyl acrylate, and combinations thereof;
- (iii) from 0.5% to 5.0% by weight of the copolymer of a beta-dicarbonyl monomer or a cyanocarbonyl monomer, in polymerized form; and
- (iv) from 0.1% to 2.0% by weight of the copolymer of a carboxylic or a sulfur acid functional monomer or a salt thereof, in polymerized form.

13. The stable aqueous dispersion of claim 12 comprising:
- i) from 0.8% to 1.6% by weight of the copolymer of the said phosphorus-containing monomer;
- ii) at least 20% by weight of the copolymer of ethyl acrylate in polymerized form;
- iii) from 0.5% to 5.0% by weight of the copolymer of acetoacetoxyethyl methacrylate; and
- (iv) from 0.2% to 1.0% by weight of the copolymer of a carboxylic functional monomer or a salt thereof, in polymerized form.

14. A coating composition comprising the stable aqeuous dispersion of claim 13 and titanium dioxide.

* * * * *